US 10,294,364 B2

United States Patent
Carfagnini et al.

(10) Patent No.: US 10,294,364 B2
(45) Date of Patent: May 21, 2019

(54) DURABLE POLYHYDROXYALKANOATE COMPOSITIONS

(71) Applicant: SABIO Srl, Lugo (IT)

(72) Inventors: Alessandro Carfagnini, Lugo (IT); Leonardo Bellomo, Lugo (IT)

(73) Assignee: SABIO Srl, Lugo (IT)

( * ) Notice: Subject to any disclaimer, the term of this patent is extended or adjusted under 35 U.S.C. 154(b) by 0 days.

(21) Appl. No.: 15/668,831

(22) Filed: Aug. 4, 2017

(65) Prior Publication Data

US 2017/0335099 A1 Nov. 23, 2017

Related U.S. Application Data

(62) Division of application No. 14/379,810, filed as application No. PCT/EP2013/053468 on Feb. 21, 2013, now abandoned.

(30) Foreign Application Priority Data

Feb. 21, 2012 (IT) ............................ TO2012A0155

(51) Int. Cl.
| | | |
|---|---|---|
| C08L 67/04 | (2006.01) | |
| C08L 75/04 | (2006.01) | |
| C08L 23/08 | (2006.01) | |
| C08L 51/04 | (2006.01) | |

(52) U.S. Cl.
CPC ........... *C08L 67/04* (2013.01); *C08L 23/0869* (2013.01); *C08L 23/0884* (2013.01); *C08L 51/04* (2013.01); *C08L 75/04* (2013.01); *C08L 2201/06* (2013.01); *C08L 2203/12* (2013.01); *C08L 2203/16* (2013.01); *C08L 2207/04* (2013.01)

(58) Field of Classification Search
CPC ........... C08L 67/04–67/06; C08L 75/04–75/08
See application file for complete search history.

(56) References Cited

U.S. PATENT DOCUMENTS

| | | |
|---|---|---|
| 3,493,634 A | 2/1970 | Kolycheck |
| 3,642,964 A | 2/1972 | Rausch et al. |
| 4,169,196 A | 9/1979 | Ehrlich et al. |
| 4,202,957 A | 5/1980 | Bonk et al. |
| 4,665,126 A | 5/1987 | Kusumgar et al. |
| 5,344,882 A | 9/1994 | Flexman |
| 5,380,785 A | 1/1995 | Ngoc et al. |
| 5,616,651 A | 4/1997 | Nino et al. |
| 5,731,380 A | 3/1998 | Golder |
| 5,753,782 A | 5/1998 | Hammond et al. |
| 5,939,467 A | 8/1999 | Wnuk et al. |
| 6,337,374 B1 | 1/2002 | Ngoc et al. |
| 2005/0131120 A1* | 6/2005 | Flexman ............... C08L 67/04 524/399 |
| 2006/0106162 A1 | 5/2006 | Yamaguchi |
| 2009/0018235 A1 | 1/2009 | Nascimento et al. |
| 2009/0030112 A1 | 1/2009 | Nascimento et al. |
| 2012/0271004 A1* | 10/2012 | Quinebeche ............ C08L 67/04 525/190 |
| 2015/0101728 A1 | 4/2015 | Fudemoto et al. |
| 2015/0368461 A1* | 12/2015 | Minami .................. C08K 5/053 524/387 |

FOREIGN PATENT DOCUMENTS

| | | |
|---|---|---|
| CA | 2231568 | 3/1998 |
| EP | 0583926 A2 | 2/1994 |
| EP | 0701586 A1 | 12/1994 |
| EP | 0781309 A1 | 3/1996 |
| EP | 1826241 A1 | 8/2007 |
| EP | 1657280 B1 | 8/2012 |
| EP | 2821249 A1 | 1/2015 |
| JP | H10-505872 A | 6/1998 |
| JP | 2001/199348 A | 7/2001 |
| JP | 2005/232229 A | 9/2005 |
| JP | 2005/232232 A | 9/2005 |
| JP | 2006/137854 A | 6/2006 |
| JP | 2007/126501 A | 5/2007 |
| JP | 2007302776 A * | 11/2007 |
| JP | 2008/189862 A | 8/2008 |
| JP | 2008/189863 A | 8/2008 |
| WO | 2011/007092 A1 | 1/2011 |
| WO | 2013/129628 A1 | 9/2013 |

OTHER PUBLICATIONS

Machine Translation of JP2007-302776A. Nov. 22, 2007 (Year: 2007).*

Thermal transitions of homopolymers: glass transition & melting point. Aldrich Chemical. https://www.sigmaaldrich.com/technical-documents/articles/materials-science/polymer-science/thermal-transitions-of-homopolymers.html. As viewed on Sep. 21, 2018 . (Year: 2018).*

Brunel, Daiane Gomes et al., "Natural Additives for Poly (Hydroxybutyrate-CO-Hydroxyvalerate)-PHBV: Effect on Mechanical Properties and Biodegradation", Materials Research, 2014; 17(5):1145-1156.

(Continued)

*Primary Examiner* — Stephen E Rieth

(74) *Attorney, Agent, or Firm* — Hoffmann & Baron, LLP

(57) ABSTRACT

A polyhydroxyalkanoate composition, having a an elongation at break (ASTM D648) greater than 3%, an impact resistance (ISO179 1 eA, 23° C., unnotched) greater than 18 KJ/m2 and a flexural modulus of at least 950 MPa, includes at least 25% wt of a polyhydroxyalkanoate component (I); from 5 to 40% wt of one or more thermoplastic polymers as a non-polyhydroxyalkanoate component (II); from 0 to 40% wt of one or more fillers (III); from 0 to 20% wt of one or more plasticizers (IV); and from 0 to 10% wt of one or more additives (V). The polyhydroxyalkanoate composition can be used for the preparation of durable goods that may be labelled as containing more than 20% non-fossil carbon, and for articles prepared therefrom.

18 Claims, No Drawings

(56) References Cited

OTHER PUBLICATIONS

Choi, Jea Shin, et al., "Thermal and Mechanical Properties of Poly(3-hydroxybutyrate-co-3-hydroxyvalerate) Plasticized by Biodegradable Soybean Oils", Macromol. Symp. 2003, 197:65-76.
De Wilde, B., "Biodegradation Testing Protocols" Degradable Polymers and Materials: Principles and Practice (2nd Edition) ACS Symposium Series, American Chemical Society, 2012, pp. 33-43.
"Durometer Shore Hardness Scale", Smooth-On, Inc., www.smooth-on.com, 2 pages (Last accessed Aug. 21, 2015).
Miractran Thermoplastic Polyurethane (TPU), Information Miractran http://www.miractran.co.jp/images/pdf/20150319_catalogEnglish.pdf. As viewed on Feb. 27, 2017.
Miractran, www.miractran.co.jp/product/miractran.html 3 pages (Last accessed Apr. 13, 2015).
Pereira, T.F., et al., "Effect of process parameters on the properties of selective laser sintered Poly(3-hydroxybutyrate) scaffolds for bone tissue engineering", Virtual and Physical Prototyping, 2012, 7(4):275-285.
Fatty Acid Composition of Some Major Oils, http://www.chempro.in/fattyacid.htm As viewed on May 3, 2016.
Communication from the European Patent Office dated Sep. 30, 2014 providing a corrected version of the PCT International Preliminary Report on Patentability for International Application No. PCT/EP2013/053468.
Machine Translation of JP2001/199348 A Jul. 24, 2001.
Machine Translation of JP2006/137854 A Jun. 1, 2006.
Machine Translation of JP2008/189862 A Aug. 21, 2008.
Machine Translation of JP2008/189863 A Aug. 21, 2008.
International Search Report for International Application No. PCT/EP2013/053468 dated Apr. 11, 2013 (4 pages).
Written Opinion for International Application No. PCT/EP2013/053468 dated Feb. 11, 2104 (6 pages).
Notification of Transmittal of the International Preliminary Report on Patentability for International Application No. PCT/EP2013/053468 dated Apr. 25, 2014 (14 pages).
Italian Search Report and Written Opinion dated Aug. 22, 2014 for Italian Application No. TO2012A000155 (6 pages).
Japanese Office Action for a counterpart foreign application dated Mar. 23, 2015.

* cited by examiner

DURABLE POLYHYDROXYALKANOATE COMPOSITIONS

CROSS-REFERENCE TO RELATED APPLICATIONS

This application is a divisional of U.S. application Ser. No. 14/378,810, filed Aug. 20, 2014, which is the National Stage of International Application No. PCT/EP2013/053468, filed Feb. 21, 2013, which claims the benefit of Italian Application No. TO2012A000155, filed Feb. 21, 2012, the contents of all of which are incorporated by reference herein.

TECHNICAL FIELD

The current invention concerns durable polyhydroxyalkanoate compositions. More in particular, the present invention relates to polymeric compositions that are based on polyhydroxyalkanoate polymers, which are biodegradable and renewable bioplastics, and that can be melt processed similar to polypropylene based compositions into various forms such as moulded articles, films, fibers and nonwovens, and the like.

BACKGROUND ART

While aromatic polyesters are almost totally resistant to microbial attack, most aliphatic polyesters are biodegradable due to their potentially hydrolysable ester bonds. Polyhydroxyalkanoates or PHAs are linear polyesters produced in nature by bacterial fermentation of sugar or lipids and hence are considered renewable bioplastics. These bioplastics are produced by bacteria to store carbon and energy. More than 150 different monomers can be combined within this family to give materials with extremely different properties. These polymers are biodegradable. Poly(3-hydroxybutyrate) or P(3HB) is the best well-known and most used member of the class of PHAs. It was discovered by Lemognie in 1925 in the bacteria *Alcaligenis euterophus*, in which, under optimal conditions, above 80% of the dry weight is of P(3HB). PHAs with short side chains, such as polyhydroxybutyrate (PHB), a homopolymer of 3-hydroxybutyric acid units, are crystalline thermoplastics; PHAs with long side chains are more elastomeric. PHAs of microbial origin containing both 3-hydroxybutyric acid units and longer side chain units from C5 to C16 are also known. A number of bacteria which produce copolymers of 3-hydroxybutyric acid and one or more long side chain hydroxyacid units containing from five to sixteen carbon atoms have been identified. A known example of specific two-component copolymers includes PHB-co-3-hydroxyhexanoate. Other biodegradable polymers are polylactic acid (PLA), polycaprolactone (PCL), polybutylene succinate (PBS), polyanhydrides, polyvinyl alcohol (PVA), most starch derivatives, and cellulose esters like cellulose acetate and nitrocellulose and their derivatives (celluloid). In this application PLA and PCL are not considered PHAs since PLA is produced chemically from lactic acid or lactide, and PCL is produced starting from fossil fuel. PHAs are considered fully compostable, meaning they will biodegrade under common composting conditions. These biodegradable polymers are typically used for disposables.

US 2009018235, for instance, refers to a polymeric composition prepared from a biodegradable polymer defined by poly(hydroxybutyrate) (PHB) or copolymers thereof, and at least one other biodegradable polymer, such as polycaprolactone (PCL) and poly (lactic acid) (PLA), so as to alter its structure. The composition further comprises at least one additive of the type of natural filler and natural fibers, and, optionally, nucleant, thermal stabilizer, processing aid, with the object of preparing an environmentally degradable material.

US 2009030112 describes a biodegradable polymeric composition for manufacturing biodegradable articles and films, that comprises PHB, plasticizer obtained from a renewable source, nucleant additive, flow aid additive and a thermal stabilizer additive.

EP 781309 A and CA 2231568 both relate to polymeric compositions that are biodegradable and that can be melt processed into various forms, including films, fibers, and nonwovens. The compositions include compatible or semi-compatible blends of biodegradable polymers and have physical and thermomechanical integrity. Films formed from preferred polymeric compositions are suitable for use as backsheets in disposable absorbent articles. In a preferred embodiment, the polymeric composition includes a polyhydroxyalkanoate and at least one other biodegradable polymer selected from aliphatic polyester-based polyurethanes, a polylactide, polycaprolactone, or a mixture of two or more of these polymers.

Biodegradable compositions further comprising PLA and/or starch or similar biodegradable polymers have been used particularly for the manufacturing of disposables. On the other hand, PHAs have also been used in non-disposables or durable goods, as replacement for fossil or petrochemical based polymers. In such applications being made and accordingly being labelled as made a composition from a renewable source is highly appreciated. Biodegradability for non-disposable and/or durable goods is then a disadvantage. For durable goods, the presence of degradability enhancing components like PLA and starch are clearly undesired. PLA, being rather crystalline in nature, is undesired also for its lack of thermal stability and rather poor processability.

WO 2011/007092 relates to a PHA composition, further including: (A) a core-shell elastomer compound; and (B) an olefin copolymer including an ethylenic monomer having an epoxy function. Said composition exhibits excellent impact properties, in particular under cold conditions. The invention also relates to a method for manufacturing said composition and to parts manufactured from said composition. Component (B) may for instance be Lotader® AX 8900 (see Examples), an acrylic type terpolymer. On the other hand, the compositions are based on PLA and therefore not an ideal replacement of conventional plastics.

EP1826241 also discloses a resin composition comprising an aliphatic polyester type biodegradable polymer and a copolymer of the core-shell type comprising an acrylic rubber as the core layer and a vinyl-monomer-derived polymer as the shell layer. The biodegradable polymer may be a PHA. The acrylic rubber comprises an alkyl acrylate co-polymer which may also comprise aromatic vinyl monomers. The compositions are exemplified in experiments with several PHAs and a core-shell graft copolymer comprising an acrylic rubber as the core layer and a vinyl monomer-derived polymer as the shell layer (Kane Ace M-400, from Kaneka). Although the copolymer improve some of the mechanical properties, there is still room for further improvement.

EP 0701586 A discloses a polyester composition that comprises a biodegradable polyester and a plasticising quantity of a particular plasticizer.

Although it is known that polyhydroxybutyrate (P3HB) has properties very similar to polypropylene (PP), it is more crystalline than PP and typically has a lower tensile strength and lower elongation at break. It is therefore not as easy to melt process into consumer articles, and the articles so produced are more fragile. On the other hand, there is an increasing demand for bioplastics and compositions based thereon.

Vincotte is an organisation specialized in certifying biodegradable products. As a result of the increased environmental awareness among customers, there is a growing market for products on a basis of renewable raw materials. That environmentally conscious motivation on the part of customers is exactly the reason why there is a need for an independent, high-quality guarantee of the renewability of raw materials. Vincotte therefore proposes a single to four star "OK biobased" certification system, that provides information on the content of renewable materials in the labelled product.

Many companies have tried to prepare compositions that contain more than 20% (by weight) of non-fossil carbon (single star "OK biobased"), preferably more than 40% wt of non-fossil carbon (double star "OK biobased") and that can substitute the common PP based compositions for durable mass-produced goods such as mobile phone parts. Of importance, such compositions should have good thermal and mechanical properties. For instance, it should have an elongation at break (ASTM D638) of greater than 3%, preferably greater than 3.5%, more preferably greater than 4%, an impact resistance (ISO179 1 eU, 23° C., unnotched) of greater than 18 kJ/m$^2$, and a flexural modulus (ASTM D790) of greater than 950 MPa, preferably greater than 1000 MPa, more preferably greater than 1500 MPa. Such thermal and mechanical properties are important for the production of durable goods and for the properties of these durable goods.

Unfortunately, so far no compositions that contain more than 20% wt of non-fossil carbon have been found that can meet the demands both of the producers and the end-users. It is therefore of interest to find a composition that can be used as a PP substitute in such applications.

Moreover, it would be of interest to find compositions that have improved processing properties. For instance, a common PP composition may have a melt flow index (MFI, ASTM D1238 @ 230° C./2.16 kg) of 26 g/10 min. Achieving a similar MFI at a lower temperature will allow milder injection moulding conditions and thus will provide some energy savings while processing the composition. Finally, it would be of interest to find a composition that shows better aesthetical properties (gloss), improved ability to be printed, painted or coated (polypropylene requires a special treatment), and improved UV stability. Such compositions have now been found.

DISCLOSURE OF INVENTION

The current invention provides a composition as claimed in claim 1. In particular, the invention provides a polyhydroxyalkanoate composition having an elongation at break (ASTM D638) greater than 3%, an impact resistance (Charpy test, ISO179 1 eU, 23° C., unnotched) greater than 18 KJ/m$^2$ and a flexural modulus of at least 950 MPa comprising:

at least 25% wt of a polyhydroxyalkanoate component (I), comprising one or more hydroxyalkanoate copolymers and wherein the content of poly(3-hydroxybutyrate) homopolymer is at most ¼$^{th}$ of the total amount of component (I) and less than 5% wt;

from 5 to 40% wt of one or more thermoplastic polymers as a non-polyhydroxyalkanoate component (II), comprising no more than 5% wt biodegradable polymers (ASTM D6400);
from 0 to 40% wt of one or more fillers (III);
from 0 to 20% wt of one or more plasticizers (IV); and
from 0 to 10% wt of one or more additives (V),
wherein
component (I) and (II) together comprise at least 40% wt of the composition, and
the % wt of the components is calculated on the total weight of components (I) to (V) of the composition and adds up to 100% wt. More preferably, the composition comprises a 3HB copolymer as main PHA component (I). Thus, it may comprise the 3HB homopolymer, P(3HB), but only up to 5% wt on the PHA composition. In addition, it may contain no more than 5% wt of PLA or other biodegradable polymer as component (II) in the PHA composition. The composition further comprises an acrylate polymer and/or thermoplastic polyurethane (TPU). Moreover, it may comprise an epoxidized vegetable oil (preferably epoxidized soybean oil) as plasticizer and/or a filler.

MODE(S) FOR CARRYING OUT THE INVENTION

Polyhydroxyalkanoates are known. P(3HB) is the most common representative of this class of biobased polyesters. However, it has been found that the mechanical and thermal properties of this homopolymer are insufficient. On the other hand, it has been found that the use of a copolymer of a hydroxyalkanoate (with one or more dissimilar hydroxyalkanoates) does allow for compositions that have the desirable mechanical and thermal properties (close to or better than those of polypropylene-based compositions). The definition of a copolymer indicates that there is at least one repeating unit that is dissimilar to the hydroxyalkanoate used as the main repeating unit; it excludes homopolymers.

Component (I) therefore preferably comprises one or more copolymers of a 3-hydroxyalkanoate. More preferably, the PHA composition comprises one or more copolymers of 3-hydroxybutyrate and a 3-hydroxyalkanoate with more than 4 carbon atoms; and/or one or more copolymers of 3-hydroxybutyrate and a 4-hydroxyalkanoate with 4 or more carbon atoms; and/or a terpolymer of 3-hydroxybutyrate and two or more hydroxyalkanoates as component (I). Typical and preferred examples of such copolymers include the copolymer of 3-hydroxybutyrate and 4-hydroxybutyrate p(3HB-co-4HB), the copolymer of 3-hydroxybutyrate and 3-hydroxyvalerate p(3HB-co-3HV), the copolymer of 3-hydroxybutyrate and 3-hydroxyhexanoate p(3HB-co-3HH) or a copolymer of 3-hydroxybutyrate and 3-hydroxyoctanoate p(3HB-co-3HO). P(3HB-co-3HV) is most preferred.

Also blends of polyhydroxyalkanoates may be used. Such blends may even comprise a minor amount of homopolymers (i.e., up to ¼$^{th}$ on the blend of such polyhydroxyalkanoates). On the other hand, the presence of homopolymers is preferably avoided. For instance, the PHA composition preferably contains less than 5, preferably less than 3% wt poly(3-hydroxybutyrate) homopolymer.

The polyhydroxyalkanoate is preferably present in an amount of 35 to 85% wt. Interestingly, it has been found that a durable composition may be made, with at least 35% wt of a polyhydroxyalkanoate component (I). This is surprising since this component in principle is highly biodegradable. The expression "durable", used in respect of the composition, is the opposite of biodegradable.

Both "durable" and "biodegradable" are terms that have not been clearly defined. According to Wikipedia, a durable good or a hard good in economics is a good that does not quickly wear out, or more specifically, one that yields utility over time rather than being completely consumed in one use. Highly durable goods such as refrigerators, cars, or mobile phones usually continue to be useful for three or more years of use, so durable goods are typically characterized by long periods between successive purchases. Examples of consumer durable goods include cars, household goods (home appliances, consumer electronics, furniture, etc.), sports equipment, and toys.

Nondurable goods or soft goods (consumables) are the opposite of durable goods. They may be defined either as goods that are immediately consumed in one use or ones that have a lifespan of less than 3 years.

Biodegradable compositions are compositions that in accordance with the ASTM D6400 standard undergo at least 60% biodegradation within 180 days. A durable composition on the other hand should stay well below 10% biodegradation under this condition.

The current composition may be used in the preparation of durable goods as a result of the other components in the composition, more in particular component (II). Component (II) may be selected from one or more of the thermoplastic polymers (IIa), or (IIb) defined hereinafter.

Preferably a thermoplastic polyurethane (IIa) is used as component (II), more preferably a TPU have a Melting Point (measured according to ASTM3418) lower than 200, preferably lower than 190, more preferably lower than 180° C. Alternatively or additionally, the thermoplastic polyurethane (IIa) may suitably have a glass transition temperature Tg lower than 40° C. (measured according to ISO 11357) and/or a hardness lower than 56 Shore D (measured according to ASTM D2240). Thermoplastic polyurethanes (TPUs) are particularly advantageous as component (IIa), such as the TPUs described in U.S. Pat. Nos. 5,344,882 and 5,731,380, incorporated herein by reference. The thermoplastic polyurethanes suited for use in the compositions of the present invention can be selected from those commercially available or can be made by processes known in the art. See, for example, Rubber Technology, 2nd edition, edited by Maurice Morton (1973), Chapter 17, Urethane Elastomers, D. A. Meyer, especially pp. 453-6. Thermoplastic polyurethanes used herein are derived from the reaction of polyester or polyether polyols with diisocyanates and optionally also from the further reaction of such components with chain-extending agents such as low molecular weight polyols, preferably diols, or with diamines to form urea linkages. Thermoplastic polyurethanes are generally composed of soft segments, for example polyether or polyester polyols, and hard segments, usually derived from the reaction of the low molecular weight diols and diisocyanates. While a thermoplastic polyurethane with no hard segments can be used, those most useful will contain both soft and hard segments. Processes for making TPUs are well known and include both single or multiple step polymerizations. In a single step or "one-shot" polymerization, the diisocyanate, polyol and chain extending agent are combined and reacted, whereas in a multiple step process the polyol is first reacted with the diisocyanate to produce a prepolymer which is subsequently reacted with the chain extender to build molecular weight. Such processes are disclosed, for example, in U.S. Pat. Nos. 3,493,634; 3,642,964; 4,169,196; 4,202,957; and 4,665,126.

More preferably this TPU is a block copolymer. Excellent results have been achieved with a polyurethane that is based on a saturated polyester, preferably based on adipic acid, reacted with an aromatic isocyanate, preferably 4,4'-methylenediphenyl diisocyanate (MDI). Most preferably the PU is a block copolymer commercially available as Laripur® 8025. This component may be used as sole component (II), but is preferably used in combination with another thermoplastic polymer, as discussed hereinafter.

Another suitable thermoplastic polymer as component (II) is an acrylic polymer with a value of Melt flow Index (ASTM D1238, 175° C./2.16 kg) higher than 0.25 g/10 min and/or a glass transition temperature, Tg, less than 150° C., preferably less than 120° C., more preferably less than 100° C. This expression includes a block copolymer (IIb1) with a core that is butadiene based and/or acrylic based rubber, and that is crosslinked. For instance, suitable are methacrylate/butadiene/styrene multiphase composite interpolymers such as those available from Rohm & Haas Co under the tradename PARALOID. This component is preferably a crosslinked butadiene acrylonitrile elastomer, and/or a crosslinked acrylate terpolymer, more preferably a crosslinked styrene-acrylate elastomer. Most preferably this component is a block copolymer of acrylate, styrene and acrylonitrile, commercially available as Sunigum® P2100.

Alternatively, the acrylic polymer may be a terpolymer (IIb2) containing maleic and/or glycidyl groups. For instance, U.S. Pat. No. 5,380,785, incorporated herein by reference, specifically discloses acrylate terpolymer rubbers being comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene, (e) a half ester maleate soap and (f) a crosslinking agent. Sunigum™ P95 is a suitable component, that is a copolymer rubber obtained by copolymerization of styrene, acrylonitrile, butyl acrylate, methyl methacylate, acrylic acid, methacrylic acid, and divinyl benzene. U.S. Pat. Nos. 5,616,651 and 6,337,374 describe the composition and preparation of the copolymer rubber and are incorporated herein by reference. Preferably, this is a terpolymer of ethylene, an acrylate or methacrylate e.g. the methyl ester thereof, and glycidyl methacrylate or glycidyl acrylate, more preferably, a terpolymer that is commercially available as Lotader® AX 8900. Other suitable acrylic polymers have been described in EP 583926 describing acrylic thermoplastic elastomers exhibiting good weathering, good colorability, and a useful balance of tensile and elongation properties when molded into articles. The process described in this document avoids the formation of core/shell particles.

Thermoplastic polyurethane polymers (IIa) and acrylic polymers (IIb, IIb1 or IIb2) can contain monomers derived from renewable natural sources.

In biodegradable compositions it is common to use a biodegradable polymer as component (II) in addition to the PHA. Such biodegradable polymers undergo at least 60% biodegradation within 180 days in accordance with the ASTM D6400 standard. Examples are PLA; PCL; PBS; aliphatic polyanhydrides; polyvinyl alcohol (PVA); starch and starch derivatives, and cellulose esters and their derivatives. In the current composition, meant for durable articles, such biodegradable or even compostable polymers are rather undesirable. Small amounts of such polymers may still end up in the composition. For instance PLA and PVA are frequently used as carrier in pigment masterbatch compositions. Accordingly, such polymer, if present at all, should not comprise more than 5% wt of the composition.

Moreover, it has been found that the presence of PLA adversely affects the mechanical properties of the PHA composition. Thus, the presence of PLA results in a lesser impact resistance measured according to the Charpy test, (ISO 179 1 eU, unnotched), and a reduced elongation at break (ASTM D638). Likewise, the presence of PBS as single component (II) results only in a marginal improvement for the elongation at break, whereas both the elongation at break and the impact resistance greatly improve upon use of a TPU.

In other words, the presence of component (II) is not only essential for the durability of the PHA composition; it also significantly improves the mechanical properties (impact resistance and elongation at break). Thus, a synergistic effect was found for the elongation at break when a combination of an acrylic polymer and a TPU was used. Using a combination of such components is therefore preferred. If a combination of an acrylic polymer and a TPU is used, the acrylic polymer can be any acrylic polymer, but is preferably selected from acrylic block copolymer (IIb1) and an acrylic terpolymer (IIb2), as described above. If a combination of components is used, then the combination of components TPU and acrylic polymer is used in relative weight amounts of 3:1 to 1:3, preferably 2:1 to 1:2.

Preferably, the non-polyhydroxyalkanoate component (II) is used in an amount of 10 to 35% wt.

Although not essential, fillers are commonly used in moulded articles. In the composition of the present invention, common fillers may be used. Thus component (III) may be selected from mineral fillers, synthetic fillers or mixtures thereof, preferably mineral fillers selected from talc, carbonates, silicates (more preferably clays and zeolites), and/or metal oxides (more preferably titanium oxide, zinc oxide, magnesium oxide). The amount of fillers in the composition may vary widely. Preferably, the amount of filler is between 10 and 30% wt.

Although not essential, it is common to use plasticizers in compositions meant for moulding. However, the inventors found that the mechanical properties of the composition may be adversely affected by the plasticizer. Surprisingly, epoxidized oil provides the best balance of elongation at break and resistance to heat softening. The oil may have a fossil origin or a vegetable origin. The epoxidized oil can be aliphatic, including cycloaliphatic, or aromatic but preferably does not have olefinic unsaturation which is subject to oxidative degradation. Preferred examples of such compounds are epoxy substituted ethers, esters, phosphonates and the like as well as high molecular weight polymers which are epoxy substituted. Most preferred compounds are those comprised of at least 6 carbon atoms including 1,2-epoxyoctadecane, styrene epoxide, butyl-epoxy stearate, epoxidized polybutadiene, poly(alkylglycidyl)ethers, p-chlorophenoxypropylene oxide, dicyclopentadiene diepoxide, diglycidyl ether of bisphenol A, epoxidized fatty acid triglycerides such as epoxidized soybean oil, linseed oil, sunflower seed oil, safflower oil, hempseed oil, oiticica oil, sesame oil, cottonseed oil, castor oil, olive oil, peanut oil, rapeseed oil, coconut oil, babassu oil, palm oil and the like. Preferably, component (IV) is an epoxidized oil with a vegetable source, more preferably epoxidized soybean oil. Using an epoxidized oil with a vegetable source allows the percentage of non-fossil carbon to go even further up. Component (IV) is preferably used in an amount of 1 to 15% wt.

Finally, the polyhydroxyalkanoate composition may contain one or more common additives. Suitable additives include antioxidants, anti-hydrolysis agents, UV stabilizing agents, pigments and surface modification agents. Other additives that may be used include blowing agents, mould release agents, anti-scratch agents and antibiotics.

The fillers, plasticizers and additives that can be used in the composition according to the invention may be obtained from natural sources or synthetic sources. Some of them may suitably be derived from renewable natural sources.

The composition of the present invention is preferably used in conventional moulding processes under typical process conditions. The temperature settings may be slightly lower than those used when a polypropylene based composition is used. Aside from this, no further adaptation of equipment and the like is needed. Indeed, being able to substitute PP based compositions is one of the merits of the current invention.

The composition of the present invention is preferably used for the preparation of durable goods, allowing these durable goods to be labelled as containing more than 20 preferably more than 40, more preferably more than 60% wt non-fossil carbon. The durable goods made from the present composition are believed to be novel. They too may be labelled or marketed as containing more than 50% wt non-fossil carbon. Accordingly this patent also claims the articles made from the composition of the present invention. In particular articles made for automotive applications, household goods (home appliances, consumer electronics, furniture, etc.), sports equipment, and toys.

The invention is illustrated by the following examples.

EXAMPLES

Quick Description of Methods
Mechanical Properties:
"Elongation at break" (ASTM D638) measures the maximum deformation that a specimen subjected to a force can withstand before breaking down in two pieces. In the present case high values are desirable.
"Strength at break" (ASTM D638) measures the maximum force that a specimen can withstand before breaking down in two pieces. In the present case high values are desirable.
"Flexural Modulus" (ASTM D790) measures the force that is needed to bend a specimen. Either high or low values are desirable, depending on the needs.
"Izod" Resilience/impact resistance test method (ASTM D256) measures the energy that is absorbed before breaking. The more energy is absorbed by the material, the more difficult it will be to fracture the test sample. Tests were performed at 0° C. with specimen that were notched. In case a specimen did not break or only break partially, they are rated "NB" and "RP" respectively. In this case high values are desirable; although RP is even better and NB is better than RP.
"Charpy" Resilience/impact resistance test method (ISO 179 1 eU) measures the same property as the Izod test. In this case the specimens were unnotched and the tests were carried out at the temperatures indicated in the Tables.

Thermal Properties:
"Vicat" (ASTM D1525) measures the temperature at which a 1 mm$^2$ flat-ended needle will penetrate 1 mm into a material under a specified load and heating rate. The Vicat softening temperature can be used to compare the heat softening characteristics of different materials. The measurement is carried out with a heating rate of 50° C./hr, and a loading of 10N, unless indicated otherwise. In the present case high values are desirable.

Aesthetical Properties:
"Gloss 60°" measures the quantity of light reflected by a surface. In the present case high values are better.
"Surface tension" is an indirect measure of the polarity of the surface. In the present case high values are better, because paint/adhesive will be easier to apply.
Environmental Properties:
"% wt coming from renewable sources" ("Environmental property") indicates the w/w percentage of ingredients, the carbon of which proceeds from renewable sources (in the specification also referred to as "non-fossil carbon"). In this case applies: the higher, the better.
Quick Description of Materials:
In the Experiments the following raw materials were used:
P(3HB-co-3HV) or PHBV, (Enmat™ from TIANAN)
TPU polymer, Laripur™8025, adipate based polyurethane from COIM
Acrylic polymer, Sunigum™ P2100 from ELIOKEM PLA
PBS, Bionolle™ from SHOWA
Epoxidized Soybean Oil (ESBO), VIKOFLEX™ 7170 from ARKEMA
Triethyl Citrate, Citrofol™ from JUNGBUNZLAUER
Glycerine
Polyadipate, Palamoll™ from BASF
Talc CAS 14807-96-6

Example 1, Comparison with PP

Table 1 shows a comparison between a PP based composition based on 69.2% wt polypropylene, 0.5% wt antioxidant; 0.8% wt titanium dioxide and 29.5% wt talc and a PHA composition according to the invention, containing 56.5% wt P(3HB-co-3HV), 16.0% wt TPU, 0.5% wt antioxidant, 3.5% wt epoxidized soybean oil and 23.5% wt talc. The table shows that the PHA composition is very similar to the PP based composition, even outperforming the PP based composition in terms of flexural modulus, thermal properties and gloss.

The table here below represents the amounts of the ingredients of the PP-based composition and the PHA-based composition.

TABLE 1

| | | | | PP-based composition | PHA-based composition |
|---|---|---|---|---|---|
| Mechanical properties | Strength at break | ASTM D638 | MPa | 28 | 27 |
| | Flexural modulus | ASTM D790 | MPa | 3040 | 3255 |
| Thermal properties | Vicat B | ASTM D1525 | °C. | 93 | 97 |
| Aesthetical properties | Gloss 60° | | | 36 | 75 |
| | Surface Tension | | mN/m | 31 | 38 |
| Environmental properties | % wt of ingredients with carbon from renew. sources | | % wt | 0 | 60 |

Example 2, Adverse Effect of PLA

Table 2 shows the components used in this model experiment. In this case, no plasticizer was present. One composition was made with TPU as component (II), the comparative composition was made used PLA. In Table 3 the effect on the mechanical properties is illustrated. This table clearly shows the adverse effect on both resilience and elongation at break.

TABLE 2

| | Entry 1 | Entry 2 |
|---|---|---|
| P(3HB-CO-3HV) | 60% | 60% |
| TPU | 20% | |
| PLA | | 20% |
| Plasticizer | — | — |
| Talc | 20% | 20% |
| | 100% | 100% |

TABLE 3

| | | Entry 1 | Entry 2 |
|---|---|---|---|
| Izod test, notched (0° C.) | ASTM D256 J/m | 30.4 | 12.9 |
| Charpy test, unnotched (23° C.) | ISO179 1eU KJ/m$^2$ | 50.4 | 10.6 |
| Elongation at break | ASTM D638 % | 7.9 | 2.3 |

Example 2, Component (II)

Table 4 shows a composition containing the pure PHA (comparative) and compositions containing TPU polymer, acrylic polymer or a mixture of polyurethane and acrylic polymers. Table 5 reports measures of physical properties.

Entry 4, Entry 5 in comparison to Entry 3 show that the presence of the claimed non-HPA component (II), either an acrylic polymer or TPU polymer improve the values of both Resilience and Elongation at break.

Entry 5 in comparison to Entry 4 shows that the presence of acrylic polymers leads to a higher value of elongation at break than the one exhibited by a composition containing the same amount of TPU. Thus an object made of a material whose composition is Entry 5 will withstand a higher deformation before breaking down than one whose composition is Entry 4.

Nevertheless a comparison between Entry 4 and Entry 5 shows that the presence of TPU leads to a higher value of Vicat than the one exhibited by a composition containing the same amount of acrylic polymer. Thus an object made of a material whose composition is Entry 4 is more suitable for being used in warm environments than an object whose composition is Entry 5. Entry 6 shows a synergistic effect of the use of both acrylic polymers and TPU when elongation at break value is kept in consideration.

TABLE 4

| | Entry 3 | Entry 4 | Entry 5 | Entry 6 |
|---|---|---|---|---|
| P(3HB-CO-3HV) | 100% | 70% | 70% | 70% |
| TPU | | 30% | | 15% |
| Acrylic polymer | | | 30% | 15% |
| | 100% | 100% | 100% | 100% |

TABLE 5

|  |  |  | Entry 3 | Entry 4 | Entry 5 | Entry 6 |
|---|---|---|---|---|---|---|
| Izod test, notched (0° C.) | ASTM D256 | J/m | 23.1 | 34.3 | 30.1 | 30.9 |
| Charpy test, unnotched (23° C.) | ISO 179 leU | kJ/m² | 9.1 | 121.9 | NB | NB |
| Elongation at break | ASTM D638 | % | 2.0 | 7.5 | 16.3 | 54.1 |
| Flexural Modulus | ASTM D790 | MPa | 2510 | 1475 | 1164 | 1991 |
| Vicat (50° C./hr; 50N) | ASTM D1525 | ° C. | 132 | 86 | 62 | 74 |

Example 4, the Selection of Plasticizer

Table 6 shows compositions containing different plasticizers wherein epoxidized soybean oil is the preferred plasticizer according to the invention. Although glycerine, triethyl citrate and polyadipate are conventional plasticizers, in the current composition they are not preferred. In Table 7 the results are reported.

Entry 10, Entry 11, Entry 12, Entry 13 show different values of Elongation at break. The highest value is given by Entry 10 where epoxidized soybean oil is used. The use of epoxidized Soybean oil is preferred because represents the best trade-off between the properties of Elongation at Break and resistance to heat softening.

TABLE 6

|  | Entry 10 | Entry 11 | Entry 12 | Entry 13 |
|---|---|---|---|---|
| P(3HB-CO-3HV) | 39% | 39% | 39% | 39% |
| TPU | 19% | 19% | 19% | 19% |
| Acrylic polymer | 19% | 19% | 19% | 19% |
| Glycerine |  |  | 5% |  |
| Epoxidized soybean oil | 5% |  |  |  |
| Triethyl citrate |  | 5% |  |  |
| Polyadipate |  |  |  | 5% |
| Talc | 18% | 18% | 18% | 18% |
|  | 100% | 100% | 100% | 100 |

TABLE 7

|  |  |  | Entry 10 | Entry 11 | Entry 12 | Entry 13 |
|---|---|---|---|---|---|---|
| Izod test, notched (0° C.) | ASTM D256 | J/m | RP | RP | RP | RP |
| Charpy test, unnotched (23° C.) | ISO 179 leU | kJ/m² | NB | NB | NB | NB |
| Elongation at break | ASTM D638 | % | 89.3 | 19.6 | 12.1 | 67.2 |
| Flexural Modulus | ASTM D790 | MPa | 978 | 1030 | 1280 | 1050 |
| Vicat (50° C./hr; 10N) | ASTM D1525 | ° C. | 110 | 106 | 102 | 113 |
| Vicat (50° C./hr; 50N) | ASTM D1525 | ° C. | 40.3 | 45.2 | 30.0 | 40.5 |

Example 5, Amount of Plasticizer

Table 8 shows compositions according to the invention containing different amounts of epoxidized soybean oil. In Table 9 the results are reported.

Resilience of Entry 14, Entry 15, and Entry 16 increases with the increased amount of the plasticizer. Flexural modulus decreases with the increase of the amount of plasticizer. Entry 16 is a flexible material that has a high resistance to shocks.

TABLE 8

|  | Entry 14 | Entry 15 | Entry 16 |
|---|---|---|---|
| PHA | 63% | 60% | 56% |
| TPU | 21% | 20% | 19% |
| Epoxidized soybean oil |  | 5% | 11% |
| Talc | 16% | 15% | 14% |
|  | 100% | 100% | 100% |

TABLE 9

|  |  |  | Entry 14 | Entry 15 | Entry 16 |
|---|---|---|---|---|---|
| Izod test, notched (0°) | ASTM D256 | J/m | 30.6 | 30.7 | 38.3 |
| Charpy test, unnotched (23°) | ISO179 1eU | kJ/m² | 41.8 | 66.8 | 81.9 |
| Charpy test, unnotched (0° C.) | ISO179 1eU | kJ/m² | 34.6 | 44.8 | 52.0 |
| Elongation at break | ASTM D638 | % | 10.9 | 29.7 | 14.1 |
| Flexural Modulus | ASTM D790 | MPa | 2928 | 2157 | 1611 |
| Vicat (50° C./hr; 50N) | ASTMD1525 | ° C. | 96.4 | 74.5 | 58.4 |

Example 6, Selection of Component (II)

Table 10 shows compositions containing no non-HPA component (II) or different components (II). In Table 11 the results are reported.

Entry 7 shows the lowest values of resilience and elongation at break in comparison to both Entry 8 and Entry 9. A comparison between Entry 8 and Entry 9 shows that TPU is more effective (about the twice) in comparison to an aliphatic polyester such as PBS.

TABLE 10

|  | Entry 7 | Entry 8 | Entry 9 |
|---|---|---|---|
| P(3HB-CO-3HV) | 80% | 60% | 60% |
| TPU |  | 20% |  |
| PBS |  |  | 20% |
| Talc | 20% | 20% | 20% |
|  | 100% | 100% | 100% |

TABLE 11

|  |  |  | Entry 7 | Entry 8 | Entry 9 |
|---|---|---|---|---|---|
| Izod test, notched (0° C.) | ASTM D256 | J/m | 13.1 | 30.5 | 17.1 |
| Charpy test, unnotched (23° C.) | ISO179 1eU | KJ/m² | 8.9 | 50.4 | 23.3 |
| Elongation at break | ASTM D638 | % | 1.9 | 7.9 | 3.1 |
| Flexural Modulus | ASTM D790 | MPa | 4742 | 2931 | 3857 |
| Vicat (50° C./hr; 50N) | ASTM D1525 | ° C. | 130 | 88.2 | 87.9 |

Example 7, Compositions According to the Invention

Three compositions were made according to the preferred embodiment of the invention. All showed excellent properties.

TABLE 12

|  | 1 | 2 | 3 |
|---|---|---|---|
| PHBV | 55.0% | 74.3% | 73.1% |
| TPU | 25.0% |  | 3.2% |
| Acrylic polymer |  | 4.5% | 3.3% |
| Antioxidant | 0.2% | 0.2% | 0.3% |
| Titanium oxide | 0.4% | 2.2% | 0.4% |
| Zinc oxide | 0.1% |  | 0.2% |
| Talc | 14.3% | 14.3% | 12.0% |
| Epoxidized soybean oil | 5.0% | 4.5% | 7.5% |
|  | 100% | 100% | 100% |

TABLE 13

|  |  |  | 1 | 2 | 3 |
|---|---|---|---|---|---|
| Melt flow index (180° C./2.16 kg) | ASTM D1238 | g/10 min | 9.6 | 13.2 | 11.0 |
| Charpy test, unnotched (23° C.) | ISO179 1eU | KJ/m2 | 103.9 | 27.3 | 35.2 |
| Izod test, notched (0° C.) | ASTM D256 | J/m | 36.9 | 27.5 | 26.3 |
| Elongation at break | ASTM D638 | % | 9.30 | 4.08 | 4.46 |
| Flexural Modulus | ASTM D790 | MPa | 2560 | 2700 | 3108 |
| Vicat (50 C./hr; 50N) | ASTM D1525 | ° C. | 70 | 81.5 | 92.3 |
| Weight percentage of ingredients coming from renewable sources |  | % | 60.0 | 78.8 | 80.6 |

Example 8, Comparison with Core-Shell Type Copolymer

In order to show the effectiveness of the compositions according to the present invention in comparison to a composition comprising a core-shell type acrylic rubber thermoplastic polymer three compositions were prepared. In Entry 17 no thermoplastic polymer was added. In Entry 18 the same acrylic polymer as added in experiment 2 of Example 7 was added, and in Entry 19 a core-shell graft copolymer comprising an acrylic rubber as the core layer and a vinyl monomer-derived polymer as the shell layer (Kane Ace M-410, from Kaneka) was added. The compositions are recorded in Table 14.

The elongation at break and impact resistance were determined. The results are shown in Table 15.

TABLE 14

|  | Entry 17 | Entry 18 | Entry 19 |
|---|---|---|---|
| PHBV | 83.2% | 58.9% | 58.9% |
| Acrylic polymer |  | 24.3% |  |
| M-410 |  |  | 24.3% |
| Talc | 15.3% | 15.3% | 15.3% |
| Epoxidized soybean oil | 1.4% | 1.4% | 1.4% |
|  | 100% | 100% | 100% |

TABLE 15

|  |  |  | Entry 17 | Entry 18 | Entry 19 |
|---|---|---|---|---|---|
| Elongation at break | ASTM D638 | % | 1.7 | 7.3 | 2.8 |
| Charpy test, unnotched (23° C.) | ISO179 1eU | KJ/m² | 9.6 | 39.5 | 21.4 |
| Charpy test, unnotched (0° C.) | ISO179 1eU | KJ/m² | 7.7 | 20.0 | 13.6 |

The results clearly show that composition according to the invention performs better than the other two compositions.

Example 9, Comparison with Mixture of Two PHAs

In order to show the effectiveness of the compositions according to the present invention containing a mixture of PHAs a composition was prepared as indicated in Table 16. The performance thereof was tested. The results of the tests are shown in Table 17.

TABLE 16

| P(3HB-CO-3HV) | 35.0% |
|---|---|
| P(3HB-CO-3HH) | 20.0% |
| TPU | 19.0% |
| Acrylic polymer |  |
| Antioxidant | 0.2% |
| Titanium oxide | 0.6% |
| Talc | 18.2% |
| Epoxidized soybean oil | 7.0% |
|  | 100% |

TABLE 17

| | | | |
|---|---|---|---|
| Melt flow index (180° C./2.16 kg) | ASTM D1238 | g/10 min | 7.9 |
| Charpy test, unnotched (23° C.) | ISO179 1eU | KJ/m2 | NB |
| Izod test, notched (0° C.) | ASTM D256 | J/m | 32.5 |
| Elongation at break | ASTM D638 | % | 55.6 |
| Flexural Modulus | ASTM D790 | MPa | 1450 |
| Vicat (50 C./hr; 50N) | ASTM D1525 | ° C. | 49 |
| Weight percentage of ingredients with carbon coming from renewable sources | | % | 62.0 |

The invention claimed is:

1. A polyhydroxyalkanoate composition having an elongation at break (ASTM D638) greater than 3%, an impact resistance (Charpy test; ISO179 1eU, 23° C., unnotched) greater than 18 kJ/m$^2$ and a flexural modulus of at least 950 MPa comprising:
    at least 25% wt of a polyhydroxyalkanoate component (I), comprising one or more hydroxyalkanoate copolymers wherein the content of poly(3-hydroxybutyrate) homopolymer is and less than 5% wt;
    from 5 to 40% wt of a mixture (II) of a thermoplastic polyurethane (IIa) which is a block copolymer, and has a hardness lower than 56 Shore D, as measured according to ASTM D2240 in admixture with an acrylic polymer (IIb), which is thermoplastic, with a melting flow index according to ASTM D1238 at 175° C./2.16 kg higher than 0.25 g/10 min and/or a glass transition temperature less than 150° C.; wherein the acrylic polymer (IIb) is an acrylic terpolymer (IIb2) of ethylene, an alkyl acrylate or methacrylate, and glycidyl methacrylate or glycidyl acrylate,
    comprising no more than 5% wt biodegradable polymers (ASTM D6400);
    from 0 to 40% wt of one or more fillers (III);
    from 0 to 20% wt of one or more plasticizers (IV); and
    from 0 to 10% wt of one or more additives (V),
    wherein
    component (I) and mixture (II) together comprise at least 40% wt of the composition, and
    the % wt of the components is calculated on the total weight of components (I) to (V) of the composition and adds up to 100% wt.

2. The polyhydroxyalkanoate composition as claimed in claim 1, wherein the polyhydroxyalkanoate component (I) comprises one or more copolymers of a 3-hydroxyalkanoate.

3. The polyhydroxyalkanoate composition as claimed in claim 1, wherein the polyhydroxyalkanoate component (I) comprises one or more copolymers of 3-hydroxybutyrate and a 3-hydroxyalkanoate with more than 4 carbon atoms; and/or one or more copolymers of 3-hydroxybutyrate and a 4-hydroxyalkanoate with 4 or more carbon atoms; and/or a terpolymer of 3-hydroxybutyrate and two hydroxyalkanoates.

4. The polyhydroxyalkanoate composition as claimed in claim 1, wherein the polyhydroxyalkanoate component (I) comprises one or more of a copolymer of 3-hydroxybutyrate and 4-hydroxybutyrate p(3HB-co-4HB), a copolymer of 3-hydroxybutyrate and 3-hydroxyvalerate p(3HB-co-3HV), a copolymer of 3-hydroxybutyrate and 3-hydroxyhexanoate p(3HB-co-3HH) or a copolymer of 3-hydroxybutyrate and 3-hydroxyoctanoate p(3HB-co-3HO).

5. The polyhydroxyalkanoate composition as claimed in claim 1, wherein the thermoplastic polyurethane (IIa) is a block copolymer having a Melting Point (measured according to ASTM3418) lower than 180° C. and/or a glass transition temperature Tg lower than 40° C. (measured according to ISO 11357) and/or a hardness lower than 56 Shore D (measured according to ASTM D2240).

6. The polyhydroxyalkanoate composition as claimed in claim 5, wherein the thermoplastic polyurethane (IIa) is based on a saturated polyester based on adipic acid, reacted with an aromatic isocyanate with two or more isocyanate groups.

7. The polyhydroxyalkanoate composition as claimed in claim 1, wherein a combination of a TPU (IIa) and an acrylic polymer (IIb) is used in relative weight amounts of 3:1 to 1:3.

8. The polyhydroxyalkanoate composition as claimed in claim 1, wherein the mixture (II) is used in an amount of 10 to 35% wt.

9. The polyhydroxyalkanoate composition as claimed in claim 1, wherein component (III) is selected from mineral fillers, synthetic fillers or mixtures thereof, and/or metal oxides.

10. The polyhydroxyalkanoate composition as claimed in claim 9, wherein the mineral fillers are selected from the group consisting of talc, carbonates, silicates, clays and zeolites.

11. The polyhydroxyalkanoate composition as claimed in claim 9, wherein the metal oxides are selected from the group consisting of titanium oxide, zinc oxide, and magnesium oxide.

12. The polyhydroxyalkanoate composition as claimed in claim 1, wherein component (IV) is an epoxidized oil.

13. The polyhydroxyalkanoate composition as claimed in claim 12, wherein the epoxidized oil is an epoxidized oil of a vegetable source.

14. The polyhydroxyalkanoate composition as claimed in claim 13, wherein the epoxidized oil of a vegetable source is an epoxidized soybean oil.

15. The polyhydroxyalkanoate composition as claimed in claim 1, wherein component (V) is selected from one or more from the group of additives consisting of antioxidants, anti-hydrolysis agents, UV stabilizing agents, pigments and surface modification agents.

16. Articles prepared from a polyhydroxyalkanoate composition as claimed in claim 1.

17. A method of producing durable goods, comprising:
    providing the composition according to claim 1, and
    preparing durable goods containing more than 20% wt non-fossil carbon from the composition according to claim 1.

18. A method of producing durable goods, comprising:
    providing the composition according to claim 1, and
    preparing durable goods containing more than 40% wt non-fossil carbon from the composition according to claim 1.

* * * * *